United States Patent [19]

Lanser et al.

[11] Patent Number: 5,004,289
[45] Date of Patent: Apr. 2, 1991

[54] VISOR TORQUE CONTROL

[75] Inventors: Mike L. Lanser; Tony J. Elenbaas, both of Holland, Mich.

[73] Assignee: Prince Corporation, Holland, Mich.

[21] Appl. No.: 413,235

[22] Filed: Sep. 27, 1989

[51] Int. Cl.$^5$ ............................................. B60J 3/00
[52] U.S. Cl. ............................ 296/97.12; 296/97.13; 16/297; 16/321; 16/341; 16/342; 16/386
[58] Field of Search .................... 296/97.1, 97.9, 97.12, 296/97.13; 16/297, 321, 341, 342, 344, 376, 379, 386

[56] References Cited

U.S. PATENT DOCUMENTS

| | | | |
|---|---|---|---|
| 2,223,845 | 12/1940 | Davies | 296/97.11 |
| 2,628,125 | 2/1953 | Jacobs | 296/97.12 |
| 3,035,864 | 5/1962 | Davidson | 296/97.12 |
| 3,188,685 | 6/1965 | Fletcher | 16/342 |
| 3,399,923 | 9/1968 | Bornefeld et al. | 296/97.13 |
| 4,352,518 | 10/1982 | Prince et al. | 296/97.12 |
| 4,390,202 | 6/1983 | Flowerday et al. | 296/97.13 |
| 4,489,974 | 12/1984 | Warhol | 296/97.5 |
| 4,500,131 | 2/1985 | Fleming | 296/97.12 |
| 4,617,699 | 10/1986 | Nakamura | 296/97.9 X |
| 4,760,503 | 7/1988 | VandenBerge et al. | 362/137 |
| 4,785,500 | 11/1988 | Langridge | 16/297 |
| 4,821,374 | 4/1989 | Gavagan | 16/321 |

FOREIGN PATENT DOCUMENTS 467710  8/1950  Canada ............................ 296/97.12

Primary Examiner—Margaret A. Focarino
Assistant Examiner—Andrew C. Pike
Attorney, Agent, or Firm—Price, Heneveld, Cooper, DeWitt & Litton

[57] ABSTRACT

A visor control has a plurality of teeth extending in offset relationship from one edge thereof for interlocking the torque control to a plurality spaced notches formed through a fiberboard-type visor core for locking the torque device to the visor core. The opposite edge of the torque control includes a plurality of alternately formed spring arms which selectively engage opposite sides of a pivot rod having alternately staggered flats and lobes for controlling the visor movement between a raised stored position and a lowered use position.

16 Claims, 2 Drawing Sheets

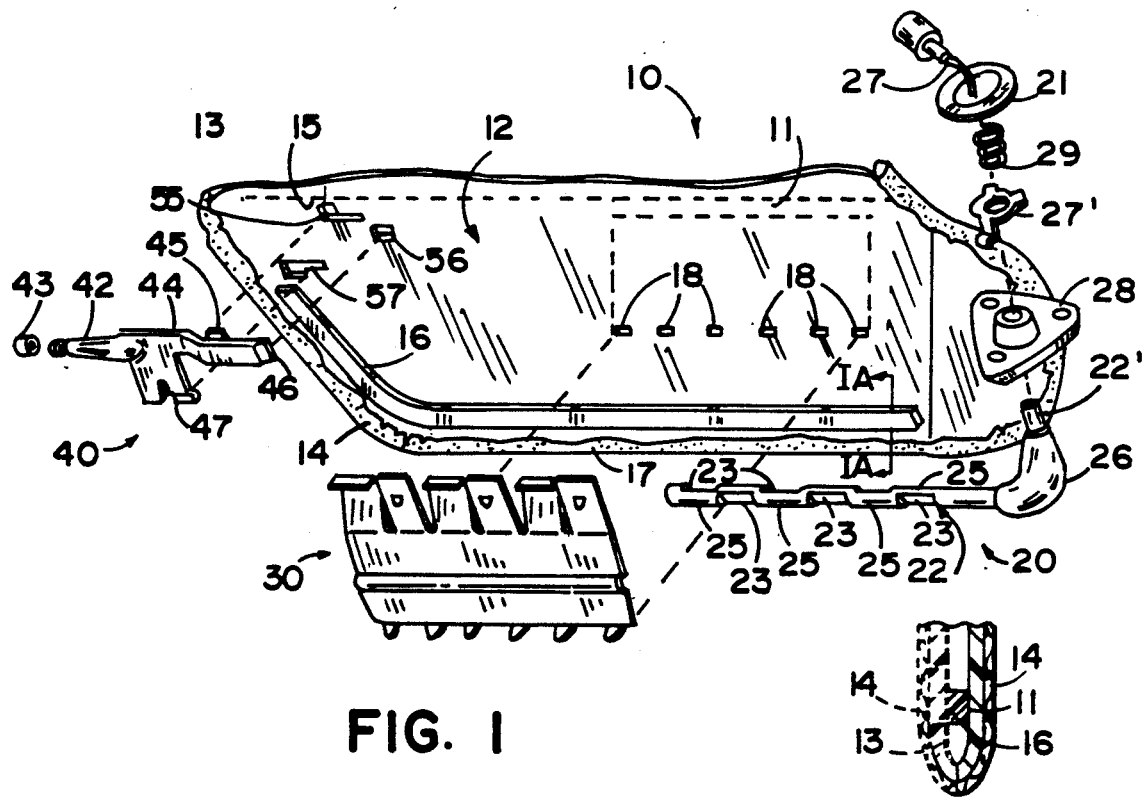
FIG. 1
FIG. 1A
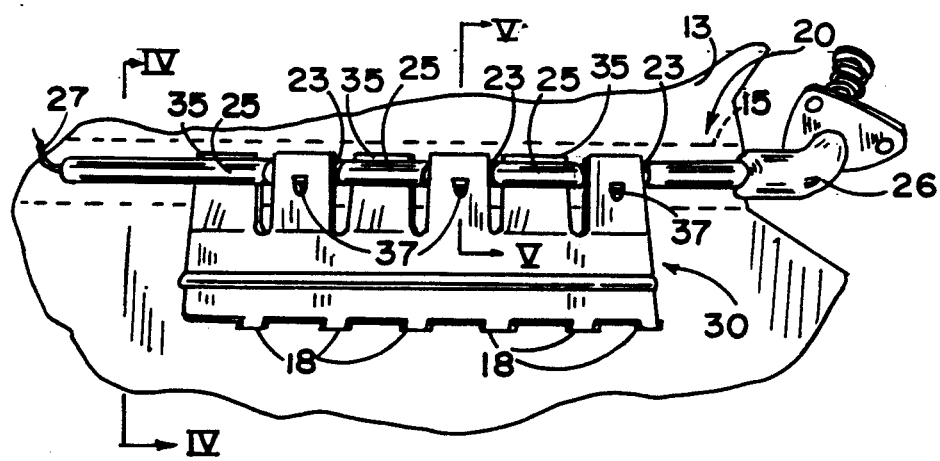
FIG. 2

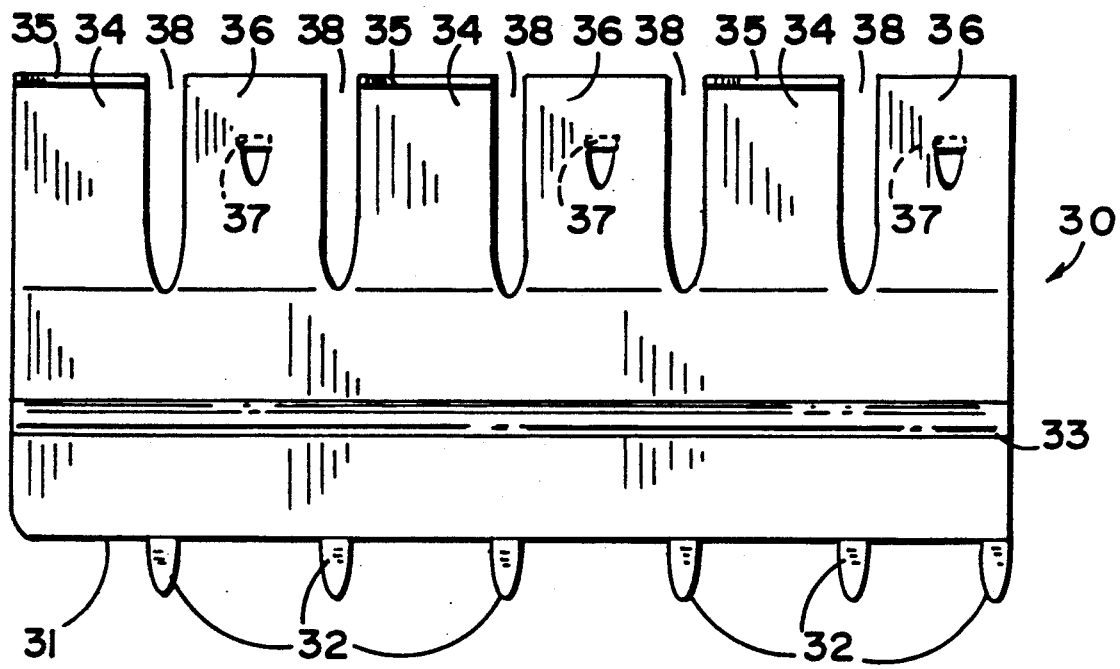
FIG. 3
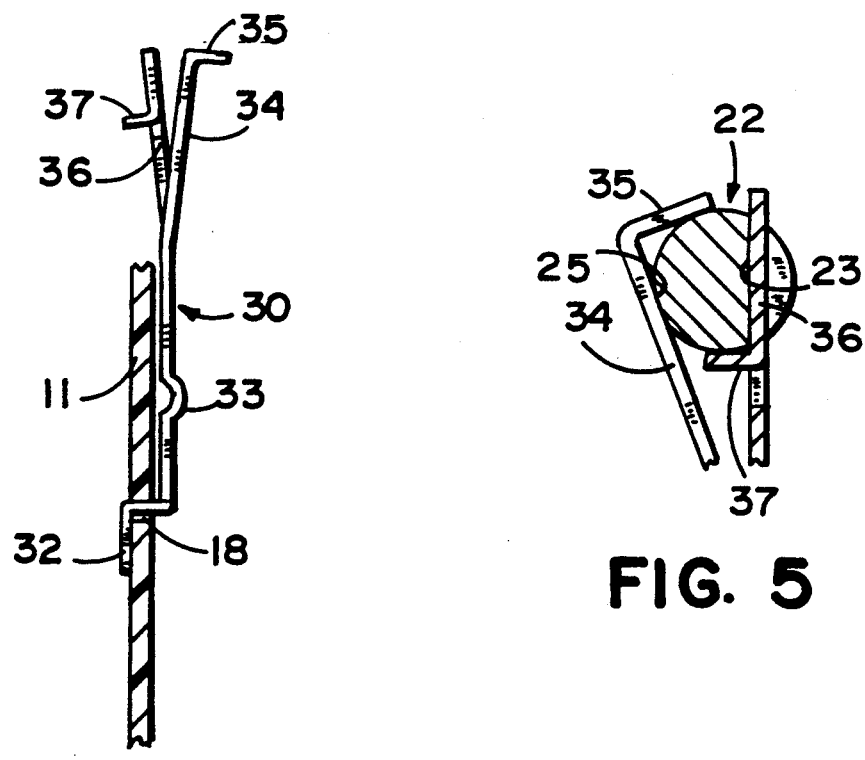
FIG. 4
FIG. 5

VISOR TORQUE CONTROL

BACKGROUND OF THE INVENTION

The present invention pertains to a visor assembly and particularly a control for releasably holding a visor in a stored position.

Visor assemblies for use in vehicles, such as automobiles, typically use some form of a friction mechanism between a pivot rod mounting the visor to the vehicle roof and the visor body to allow the visor to be lowered from the roof and adjusted to a desired lowered position, rotated about the visor rod and held in position for use. The mechanism must permit relatively easy adjustment of the visor yet hold the visor in a desired position. U.S. Pat. Nos. 4,500,131 and 4,828,313 represent visor controls, which utilize U-shaped clamps fitted within a visor body and which receive a visor rod for providing the desired control. Such clamps have been used extensively in vehicle visors and include a detent position for raising and holding the visor in a snap-up stored position against the vehicle headliner and when the visor is lowered frictionally to hold the visor with respect to the pivot rod in a selected use position.

The torque controls represented by the above patents are held within a visor core which has been molded of a polymeric material to include means for holding the control against movement with respect to the visor body. With the use of a lightweight, thin fiberboard core, as opposed to a clam-shell type core, such torque control devices cannot be readily attached to the fiberboard. Also, due to the significant pressures encountered when the visor is rotated, the torque control reacts to apply a significant force to the core. With a thin planar fiberboard core, breakage can easily occur at this interface. These problems have been addressed in the past as represented by U.S. Pat. No. 3,035,864 which discloses a visor made of a fiberboard core in which a cylindrical visor pivot rod is employed. The visor torque control extends substantially along the length of the entire upper edge of the visor and is stapled at several locations to provide sufficient surface area attachment of the torque control to the cardboard visor. Although such attachment provides a secure interconnection for this type of visor core, the visor pivot rod itself provides no detent operation and the stapling of the elongated torque control requires additional costly manufacturing and fastening steps and the added cost of the control itself. Accordingly, it is desirable to provide an improved torque control with the features and attributes of the torque control of U.S. Pat. Nos. 4,500,131 and 4,828,313 and yet attach it to a relatively thin fiberboard core.

SUMMARY OF THE PRESENT INVENTION

The visor control of the present invention satisfied this need by providing a snap-in visor pivot rod torque control which has a plurality of teeth extending in offset relationship from one edge thereof for interlocking the torque control to a plurality of spaced notches formed through a fiberboard-type planar visor core thereby locking the end of the torque device to the visor core. The opposite edge of the torque control, includes a plurality of alternately formed spring arms which selectively engage opposite sides of a pivot rod having alternately staggered flats and lobes thereon for controlling the visor movement between a raised stored position and a lowered use position. In a preferred embodiment, alternate ones of the spring arms include an inwardly projecting lip at an end thereof for circumscribing a portion of the visor pivot rod for holding the pivot rod toward the center of the torque device, while opposite ones of the spring arms include inwardly projecting tabs spaced downwardly from the inwardly formed lips for capturing the pivot rod between the lips and tabs for holding the pivot rod in position with respect to the arms. Such construction allows a relatively inexpensive stamped flat spring steel member to be employed in connection with the relatively thin lightweight fiberboard visor core which reduces the overall cost, size and weight of the visor and yet provides significant frictional control for the visor which may include accessories such as an illuminated vanity mirror package. A snap-in visor support is also provided with offset mounting legs according to another aspect of the invention. These and other features, objects and advantages of the present invention will become apparent upon reading the following description thereof together with reference to the accompanying drawings in which:

BRIEF DESCRIPTION OF THE DRAWINGS

FIG. 1 is a fragmentary exploded perspective view of a visor embodying the present invention;

FIG. 1A is a cross-sectional view taken along the plane 1A—1A of FIG. 1 and disclosing in phantom the cut-a-way side of visor not disclosed in FIG. 1;

FIG. 2 is a fragmentary perspective view of the structure shown in FIG. 1 with the visor rod shown in an assembled position;

FIG. 3 is an enlarged front elevational view of the torque control shown in FIGS. 1 and 2;

FIG. 4 is a fragmentary cross-sectional view taken along section lines IV—IV of FIG. 2 with the pivot rod removed; and FIG. 5. is a fragmentary enlarged cross-sectional view of the structure shown in FIG. 2 taken along section lines V—V of FIG. 2.

DETAILED DESCRIPTION OF PREFERRED EMBODIMENT

Referring initially to FIG. 1 there is shown a visor 10 embodying the present invention, which includes a relatively thin lightweight butterfly-shaped folded fiberboard core 12 over which there is applied a padded upholstery material 14 to provide an ornamental appearance for the visor. Core 12 includes a planar first section 11 to which a generally planar torque control 30 is mounted and an integral second section 13 which is folded over and joined to section 11 and bonded by a suitable bonding method such as by a bonding adhesive. The fold line 15 is shown in dotted lines in FIG. 1. and an illustration of the sections 11 and 13 meeting and secured to each other at edge 17 is shown in FIG. 1A. In the preferred embodiment of the invention, core 12 is made of a fiberboard having a thickness of approximately 0.070–0.080 inches. Other thin, lightweight core materials, such as a plastic, could also be employed. In the embodiment of the invention shown in FIGS. 1 and 1A, a generally L-shaped spacer bar 16 is fitted along the lower edge 17 of visor 10 to provide the desired rigidity of the lower edge 17 of visor 10 and also provides sufficient spacing between halves 11 and 13 to accommodate not only the torque control 30, but also in one embodiment, a vanity mirror package (not shown) of the type generally disclosed in U.S. Pat. No.

4,760,503, the disclosure which is incorporated herein by reference.

The visor torque control 30 of the present invention allows the use of a relatively lightweight, thin fiberboard core 12 with a vanity mirror assembly inasmuch as it is securely anchored over a relatively wide area to core section 11. Also, the control is readily attached to the core without extra fastening devices. For such purpose, core 11 includes a plurality of apertures 18 formed therein in spaced relationship to one another and in a line extending between fold line 15 and inwardly from lower edge 17 a distance to position torque fitting 30 in aligned relationship to the visor core for receiving visor pivot rod assembly 20.

Pivot rod assembly 20 includes an elongated metal pivot rod 22 having a plurality of alternately staggered flats 23 and lobes 25 formed therein as best seen in FIG. 1. The lobes 25 are defined by the absence of the flat 23 formed in the rod 22. The pivot rod 20 also includes a molded-on elbow 26 which fits within a mounting bracket 28 and is held therein by a compression spring 29 and lock nut 21 in a conventional manner. Pivot rod 20 may be a relatively thick walled hollowed rod so as to receive an electrical conductor 27 therethrough for providing power to an illuminated vanity mirror associated with visor 10. A ground contact 27' can be coupled to the conductive metal visor rod 22 at its end 22' such that when the bracket 28 is secured to the sheet metal roof of a vehicle, the visor rod 22 forms the ground connection, while conductor 27 provides the positive lead for an illuminated vanity mirror package.

The torque control 30, as best seen in FIGS. 3 and 4, is made of a relatively flat spring steel material having a thickness of about 0.025 inches which is die and stamped in the configuration shown in FIGS. 3 and 4. Control 30 includes a lower edge 31 having a plurality of outwardly extending L-shaped tips 32 or teeth spaced therealong and offset from the plane of control 30 for fitting within the notches 18 of the visor core section 11, as best seen in FIG. 2 and as shown schematically in FIG. 4. Upwardly from edge 31 there is formed a rounded flexible reinforcing channel 33 which extends the width of control 30 between arms 34 and tips 32 and orthogonal to the longitudinal axis of the arms for adding rigidity to the member as well as isolating the flexing movement of a plurality of alternately staggered spring arms 34 and 36 from the locking interconnection of tips 32 to core 11. Arms 34 and 36 are preformed by cutting notches between them and are shown in a rest position as shown in FIG. 4, but are spread apart in opposite directions as seen in FIG. 5 to receive pivot rod 22. Arms 34 include upper lips 35 which are bend to extend inwardly toward the pivot rod 22 when installed and circumscribed an upper portion of the pivot rod as best seen in FIG. 5 to hold the rod between arms 34 and 36. Arms 36 include an inwardly bent tab 37 at approximately their mid-point to provide a support ledge for the surface of pivot rod 22 opposite lips 35. Tabs 37 thus are spaced from lips 35 a distance approximately equal to the diameter of rod 22 to captively hold the rod therebetween as seen in FIG. 2. Each of the legs 34 and 36 are formed by stamping a notch 38 in the sheet metal defining the control 30 and by bending the resultant arms in the configuration shown and described above to apply a compressive pressure against rod 22 when installed.

The unit is installed by pushing the visor rod 22 between the alternately staggered arms in a position between lip 35 and tab 37 to deflect arms 34 and 36 initially toward each other and then away from each other from a position shown in FIG. 4 to a position shown in FIG. 5. When installed, the alternately staggered flats 23 and lobes 25 of rod 22 align with arms 36 and 34 respectively of control 30 as seen in FIGS. 2 and 5. This can be done in an assembly fixture or manually if desired. The pivot rod assembly is then inserted into the visor core by placing the downwardly and offset legs 32 into notches 18 of the core side 11 and pivoting the visor rod and control 30, therefore, in an upwardly position shown in FIG. 2 adjacent the fold line 15 of the core 11 and 13. The core 13 is then folded over the control and the core halves bonded together to complete the visor assembly. The upper end of the torque control 30 nests within and is partially supported at this end by the core area surrounding the legs of the control. As noted above, the core halves 11 and 13 may include other optional accessories such as an illuminated vanity mirror assembly.

Core half 11 includes another pivot rod assembly consisting of an end post assembly 40 made of a stub-axle 42 and roller tip 43 therefore. The stub-axle integrally extends from a generally L-shaped body 44 having three outwardly extending offset leg segments or end tabs 45, 46 and 47 which are offset in three different orthoganal axis and are inserted into configured slots 55, 56 and 57 respectively for holding the stub-axle assembly 40 in place. The molded plastic end post assembly 40, in turn, assists in holding the visor in place through a snap-in socket receiving member near the center of the upper windshield area.

Core 12 may be a single panel of fiberboard and the upholstery material either directly covering opposite sides of the core or attached to a thin folded fiberboard support layer in turn surrounding and attached to the core.

It will become apparent to those skilled in the art that these and various other modifications to the preferred embodiment of this invention can be made without departing from the spirit or scope thereof as defined by the appended claims.

The embodiments of the invention in which an exclusive property or privilege is claimed are defined as follows.

1. A visor torque control for a generally cylindrical visor pivot rod having a given diameter comprising:
 a member having a generally planar body located generally on a plane with a plurality of spaced tips extending outwardly from one edge thereof and offset from the plane of said member; and
 a plurality of alternately staggered elongated spring arms formed on an edge of said body opposite said tips and having a longitudinal axis, said arms including means between adjacent pairs of said arms for holding said cylindrical pivot rod in alignment.

2. The apparatus as defined in claim 1 wherein said means for holding said cylindrical pivot rod comprises an inwardly bent lip formed on ends of alternate ones of said arms.

3. The apparatus as defined in claim 2 wherein said means for holding said cylindrical pivot rod further includes inwardly bent tabs formed on alternate other ones of said arms wherein said lips and said tabs are spaced approximately equal to said diameter of said cylindrical pivot rod for captively holding the pivot rod between the lips and tabs.

4. The apparatus as defined in claim 3 further including a reinforcing flexible channel extending between said offset tips and said arms and in a direction orthogonal to said longitudinal axis of said arms.

5. The apparatus as defined in claim 4 wherein said torque control is stamped from a spring steel material.

6. The apparatus as defined in claim 5 wherein said arms are defined by notches cut out of said material.

7. The apparatus as defined in claim 6 wherein said cylindrical pivot rod includes alternately staggered flats and lobes with the flats aligning with one of said alternately staggered arms and the lobes aligned with the other of said alternately staggered arms of said control.

8. The apparatus as defined in claim 7 wherein said flats and lobes respond to compressive pressure by said arms to hold a visor in a selected lowered use position and provides snap-up control for holding said visor in a raised stored position adjacent a vehicle headliner.

9. A pivot rod assembly for a visor comprising:
a generally L-shaped body having a stub-axle extending from one end thereof, said L-shaped body including at least a pair of L-shaped end tabs extending outwardly therefrom on axes orthogonal to one another for snap fitting within notches formed within a planar visor body.

10. A visor assembly comprising:
a generally cylindrical visor pivot rod having a given diameter;
a visor body including a relatively thin planar core member located generally on a plane, said core member including a plurality of spaced notches extending in a line spaced inwardly from one edge of said core member;
a torque control for said visor pivot rod, said torque control including a member having a generally planar body with a plurality of spaced tips extending outwardly from one edge thereof and offset from said plane of said member, and a plurality of alternately staggered spring arms formed on an edge of said planar body opposite said tips and having a longitudinal axis, said arms including means for holding said visor pivot rod in alignment between adjacent pairs of said arms, wherein said tips fit into said notches of said core member; and
said generally cylindrical visor pivot rod including alternately staggered flats and lobes aligned with said alternately staggered spring arms for controlling the visor movement between different positions.

11. The apparatus as defined in claim 10 wherein said means for holding said visor pivot rod comprises an inwardly bent lip formed on ends of alternate ones of said arms.

12. The apparatus as defined in claim 11 wherein said means for holding said visor pivot rod further includes inwardly bent tabs formed on alternate other ones of said arms wherein said lips and said tabs are spaced approximately equal to said diameter of said visor pivot rod for captively holding the pivot rod between the lips and tabs.

13. The apparatus as defined in claim 12 wherein said torque control further includes a reinforcing flexible channel extending between said offset tips and said arms and in a direction orthogonal to said longitudinal axis of said arms.

14. The apparatus as defined in claim 13 wherein said torque control is stamped from a spring steel material.

15. The apparatus as defined in claim 14 wherein said arms are defined by notches cut out of said material.

16. The apparatus as defined in claim 15 in which said visor body is elongated thereby including two ends; said visor pivot rod extending from one end of said visor body; a generally L-shaped body having a stub-axle extending from one end thereof, said L-shaped body including at least a pair of L-shaped end tabs extending outwardly therefrom on axes orthogonal to one another for snap fitting within a pair of second notches formed within said planar visor core member at the end of said body opposite the said one end.

* * * * *